United States Patent

[11] 3,624,532

[72] Inventor Harold Seidel
Warren, N.J.
[21] Appl. No. 21,855
[22] Filed Mar. 23, 1970
[45] Patented Nov. 30, 1971
[73] Assignee Bell Telephone Laboratories, Incorporated
Murray Hill, Berkeley Heights, N.J.

[54] REENTRANT SIGNAL FEEDBACK AMPLIFIER
3 Claims, 5 Drawing Figs.

[52] U.S. Cl. .......... 330/9, 330/30 D, 330/24, 330/26
[51] Int. Cl. .......... H03f 1/02
[50] Field of Search .......... 330/9, 69

[56] References Cited

UNITED STATES PATENTS 2,866,018 12/1958 Bell .......... 330/9

*Primary Examiner*—Nathan Kaufman
*Attorneys*—R. J. Guenther and Arthur J. Torsiglieri

ABSTRACT: This application describes a feedback amplifier which utilizes the input signal at least twice. In the first instance, the input signal is applied to the main amplifier and experiences the full gain of the amplifier. Secondly, the input signal is used as a reference against which the amplified output signal is compared. Any difference between the reference signal and the output signal due to noise and/or distortion is identified as an error signal which is amplified in a separate error amplifier, and then injected into the input terminal of the main amplifier in phase to degenerate the error. Because the feedback only degenerates the error signal, and not the useful signal, a reentrant signal feedback amplifier is capable of operating over a greater stabilized bandwidth than conventional feedback amplifiers. In addition, an overall improvement in the signal-to-noise ratio can be realized.

INVENTOR
H. SEIDEL
BY
Sylvan Sherman
ATTORNEY

REENTRANT SIGNAL FEEDBACK AMPLIFIER

This invention relates to reentrant signal feedback amplifiers.

BACKGROUND OF THE INVENTION

It is a well-established tenet of circuit theory that the noise figure of an amplifier cannot be improved by means of conventional feedback techniques. As stated by H. W. Bode, in his book "Network Analysis and Feedback Amplifier Design," page 35, "It (feedback) is of little value, however, in dealing with noise due to thermal agitation, shot effects, et cetera, which may be expected to be troublesome in the input stage."

As will be shown, this and other seeming limitations derive from the nature of the particular feedback circuits that have been devised to date, rather than from any inherent limitations in the technique itself.

Basically, a feedback amplifier can be regarded as a combination of two signal paths. The first of these paths is the amplifier itself, or $\mu$ circuit. The other is a passive network, or $\beta$ circuit, by means of which a portion of the output of the $\mu$ circuit is coupled back to the input.

Designating the input signal as $e$, and the output signal as $E$, it can readily be shown that $$E=\mu(e+\beta E) \quad (1)$$

from which the well-known relationship $$E=\frac{\mu}{1-\mu\beta}e \quad (2)$$

is derived.

As is evident from equation (2), feedback reduces the gain of an amplifier by a factor $(1-\mu\beta)$. The advantage of feedback, however, resides in the fact that the overall gain, while reduced, is less sensitive to extraneous variations in the amplifier gain. In particular, as the feedback factor $\mu\beta$ becomes larger, the overall amplifier gain approaches $1/\beta$, and is essentially independent of the signal path.

As noted by Bode, the engineering importance of a feedback circuit resides in its ability to diminish markedly the effects of variations in gain in the $\mu$ circuit. Bode further notes, however, that the accompanying decrease in overall gain is unfortunate since it becomes necessary, in general, to use more complicated $\mu$ circuits in order to obtain adequate final gain. For example, in order to reduce the distortion of an amplifier and, thereby, increase its dynamic range, the signal degeneration introduced by the $\beta$ circuit must be made up in the $\mu$ circuit by means of additional amplifiers whose dynamic ranges are at least as large as that of the original amplifier. The cascading of amplifiers capable of satisfying this requirement has the overall effect of reducing the bandwidth of the $\mu$ circuit. This frequency sensitivity, however, is inconsistent with the Bode stability conditions, making it necessary to introduce band shaping in the $\beta$ circuit. The overall result is a general reduction in the bandwidth of the feedback-compensated amplifier.

Accordingly, it is the broad object of the present invention to derive the benefits of feedback while only minimally incurring the liabilities typically associated therewith.

SUMMARY OF THE INVENTION

A feedback amplifier, in accordance with the present invention, utilizes the input signal at least twice. In the first instance, the input signal is applied to the main amplifier and experiences the full gain of the amplifier. Secondly, the input signal is used as a reference against which the amplified output signal is compared. Any difference between the reference signal and the output signal due to noise and/or distortion, is identified as an error signal which is amplified in a separate error amplifier, and then injected into the main amplifier in such a manner and phase to degenerate the error.

It is a first advantage of the present invention that only the error is fed back and, as a result, only the error is degenerated by the feedback process. Since the error includes noise components generated in the amplifier input circuit, the degeneration of the noise without a corresponding degeneration of the input signal, makes it possible to produce an improvement in the amplifier signal-to-noise ratio. The latter, it should be noted, is modified by the noise in the error amplifier. However, as will be explained hereinbelow, the error amplifier can be a relatively small, and, hence, a very low noise amplifier whose noise contribution is significantly less than the reduction produced in the main amplifier noise by the feedback process.

It is a second advantage of the present invention, that the dynamic range of the error amplifier can be much less than the dynamic range of the main amplifier. As such, the error amplifier can be much smaller than the main amplifier and, hence, will have a much broader bandwidth than the main amplifier. As a result, the overall frequency sensitivity of the feedback loop, in accordance with the present invention, is very much less than that of a comparable prior art feedback amplifier and the stabilized bandwidth is, consequently, much greater.

Further improvements can be realized by either one of two modifications of the basic circuit. In accordance with the first modification, the entire feedback-corrected amplifier is treated as the "main" amplifier and a second error feedback path provided which further reduces the error in the output signal. In a second modification of the basic circuit, feedback is applied to the error amplifier as well as to the main amplifier in order to improve the performance characteristics of the former and, thereby further improve the performance characteristics of the overall amplifier. Both of these modifications are referred to as multiple-loop feedback amplifiers.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
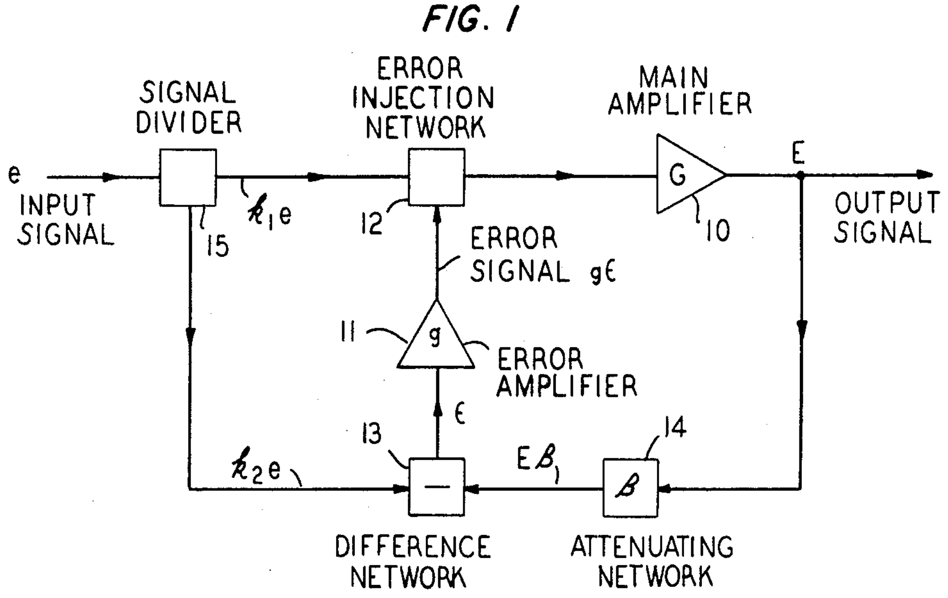
FIG. 1 shows, in block diagram, a feedback amplifier in accordance with the present invention.

Referring to the drawings, FIG. 1 shows, in block diagram, a reentrant signal feedback amplifier, in accordance with the present invention, comprising a main amplifier 10 and an error amplifier 11, either or both of which can include one or more cascaded stages. As indicated hereinabove, the input signal is utilized in two distinctly different ways. In the first instance, it is coupled to the input terminal of the main amplifier and serves, in the conventional manner, as the amplifier input signal. It is, simultaneously, used as a reference with which the amplified signal is compared to determined the error introduced by the main amplifier. Accordingly, the input signal, $e$, is divided into two components $k_1e$ and $k_2e$ by means of a signal divider 15. One component, $k_1e$, is coupled to the input terminal of amplifier 10 through an error injection network 12. The second component, $k_2e$, is coupled to a difference network 13 along with a component of signal that is proportional to the main amplifier output signal. The latter signal is coupled to network 13 from the output terminal of amplifier 10 by means of a passive attenuating network 14.

The difference signal formed by difference network 13 is amplified by means of error signal amplifier 11, and the amplified error signal is simultaneously coupled to the input terminal of amplifier 10, along with the input signal, by means of error injection network 12.

In operation, signal component $k_1e$, coupled to amplifier 10, is amplified and produces an output signal $E$, given by $$E=Gk_1e \quad (3)$$

where $G$ is the gain of amplifier 10.

A fraction, $\beta E$, of the output signal is coupled to difference network 13 along with the reference signal $k_2e$, to form an error signal $\epsilon$. The latter, which is a measure of the distortion introduced into the system by amplifier 10, is amplified by error amplifier 11 and then coupled to the input end of amplifier 10 along with the input signal.

Assuming for the moment that amplifier 10 is a perfect, noise-free amplifier, it then follows that the error signal $\epsilon$, equal to the difference between $\beta E$ and $k_2e$ will be zero. Stated algebraically, $$E\beta-k_2e=0 \quad (4)$$

Substituting from equation (3), yields $$\beta=\frac{k_2e}{E}=\frac{k_2}{k_1}\cdot\frac{1}{G} \quad (5)$$

where $\beta$ is the attenuation factor of network 14.

There are a number of important features of the feedback amplifier of FIG. 1 which distinguish it from the typical prior art feedback amplifier. The first is that there is no diminution in the overall gain of amplifier 10. As was described hereinabove, conventional feedback reduces the gain of an amplifier by a factor $(1-\mu\beta)$. By contrast, there is no corresponding gain reduction involved here. The second feature, which accounts for this first difference, is that the feedback is only applied to the error component of the amplifier signal. Since this error component includes all extraneous signals introduced by the amplifier, including thermal noise, limiting the feedback action to only the error component provides a means for reducing the magnitude of the thermal noise relative to the magnitude of the input signal and, thereby, improving the signal-to-noise ratio.

The improvement in the signal-to-noise ratio can be readily demonstrated by noting that the equivalent output noise signal, $E_n$, is given by $$E_n=v_nG \quad (7)$$

where $v_n$ is the equivalent noise signal at the input to amplifier 10, and includes three components. The first component, $e_n$, is the noise contributed by amplifier 10. The second component, $g\epsilon_n$, represents the noise contributed by error amplifier 11. The third component $\beta gE_n$, is the component of the amplified, output noise signal that is fed back to input terminal of the main amplifier. Because of the incoherent nature of the noise, the equivalent noise voltage $v_n$ is given by $$v_n=\sqrt{e_n^2+g^2\epsilon_n^2+(g\beta E_n)^2} \quad (8)$$

Substituting for $v_n$ and $\beta$ in equation (7), and noting that $g^2>>1$, we get for the output noise voltage $$E_n=\frac{k_1G}{k_2}\sqrt{\left(\frac{e_n}{g}\right)^2+\epsilon_n^2} \quad (9)$$

As will be noted from equation (9), the noise power $e_n^2$ of the main amplifier is reduced by the power gain $g^2$ of the error amplifier. In the limit, for a large error amplifier power gain, $g^2$, the output noise $E_n$ reduces to $$E_n\approx k_1G\epsilon_n/k_2 \quad (10)$$

and the signal-to-noise ratio of the amplifier approaches $$E/E_n\approx k_2e/\epsilon_n \quad (11)$$

That is, the signal-to-noise ratio of the reentrant signal feedback amplifier is determined by the noise contributed by the error amplifier. Since the latter can be a relatively small, high-quality amplifier having a small noise figure, a considerable improvement in the overall signal-to-noise ratio can be realized.

A second advantage derived from the fact that the feedback does not degenerate the signal, is an increase in the stabilized bandwidth. This can best be illustrated by means of a specific example. Let us assume for the purposes of illustration, that we want an amplifier having 20 db. of gain and 100 db. of dynamic range, where dynamic range is defined as the ratio of maximum to minimum power levels between which the amplifier can resolve signals. If, however, the distortion introduced by our amplifier is only down 60 db., an additional 40 db. of error degeneration must be provided by feedback.

In accordance with the prior art, the feedback degenerates both the useful signal and the distortion. Accordingly, an additional 40 db. of gain must be introduced in the $\mu$ circuit of prior art feedback amplifiers to compensate for the 40 db. of signal degeneration. However, the added gain must be provided by an amplifier whose dynamic range is at least equal to that of the original amplifier which, in this case, is 60 db. This then places a lower limit on the current-handling capabilities of the active elements used to provide this added gain. If, for example, transistors are used, the junction size and associated parasitics are, thereby, defined. Of particular concern is the resulting bandwidth of the $\mu$ circuit which, obviously, will be less due to the cascading of amplifiers. The overall effect is to increase the frequency sensitivity and, thereby, to significantly reduce the stabilized bandwidth of the feedback amplifier.

By contrast, in a reentrant signal feedback amplifier, in accordance with the present invention, there is no degeneration of the signal and, hence, there is no additional gain required in the $\mu$ circuit and no corresponding increase in the frequency sensitivity of the $\mu$ circuit. The 40 db. additional gain needed to degenerate the distortion is supplied by the error amplifier in the $\beta$ circuit. However, since this circuit need only handle the dynamic range of the undegenerated error signal which, in the illustrative example is only 40 db., the error amplifier can be a much smaller and, hence, a relatively low-noise, broadband amplifier. The $\mu$ circuit frequency sensitivity is, thus, much less and the Bode stability conditions can be readily satisfied over a much broader bandwidth.

Figure 2:
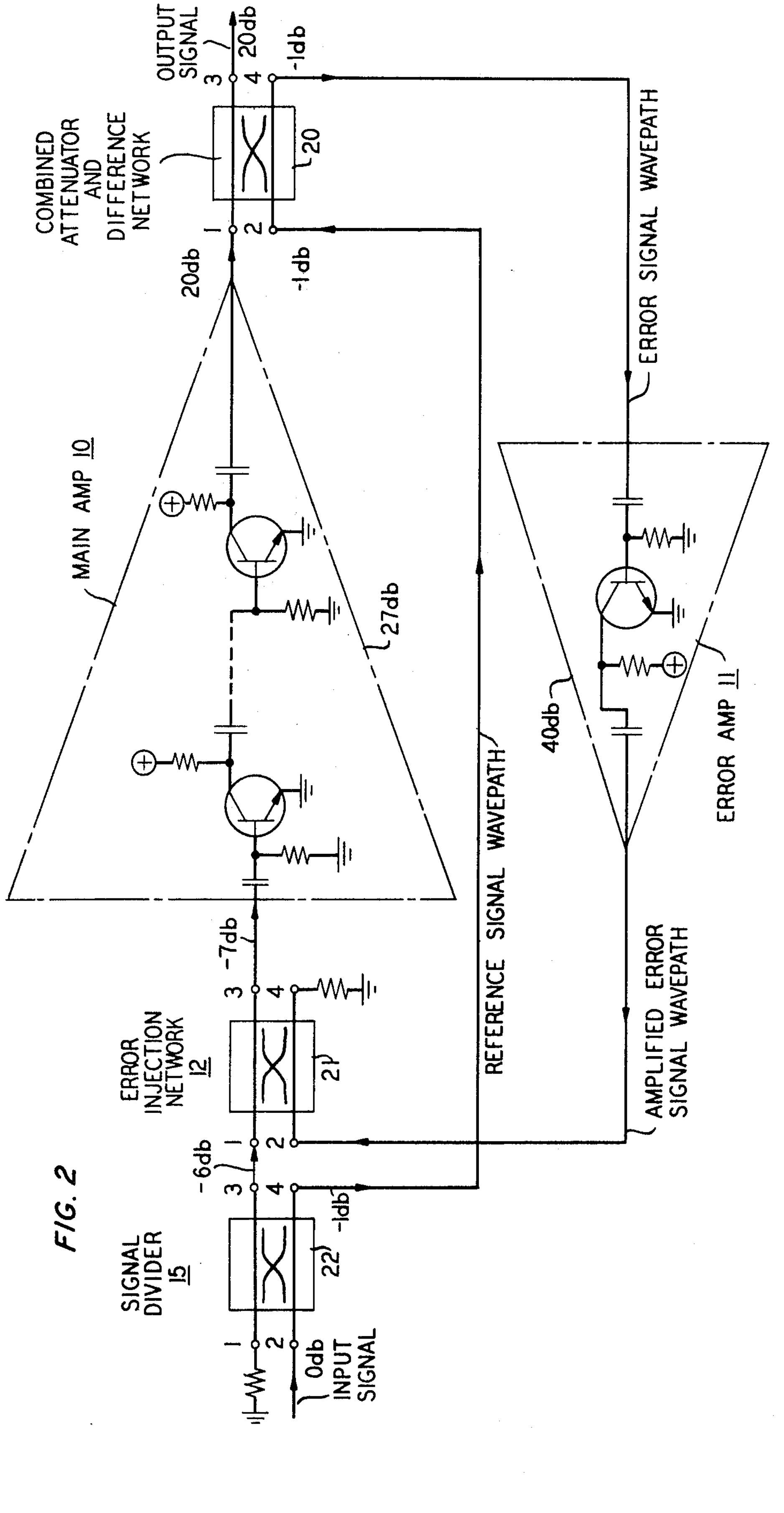

FIG. 2, included for purposes of illustration, shows a first specific embodiment of a feedback amplifier in accordance with the present invention. In this particular illustrative embodiment, main amplifier 10 comprises a multistage transistor amplifier, while the error amplifier 13 is shown as a single-stage transistor amplifier. Typically, the main amplifier will be a relatively high-power amplifier having a large dynamic range, whereas the error amplifier, by contrast, will be a relatively low-power, high-gain amplifier of more limited dynamic range. Advantageously, error amplifier 13 is also a high-quality amplifier, having a low noise figure since, as explained hereinabove, it is the noise figure of the error amplifier which primarily controls the noise figure of the overall amplifier.

In this embodiment of the invention, signal divider 15 and error injection network 21 comprise directional couplers, 22 and 21, respectively, each of which has two pair of conjugate ports 1–2 and 3–4. A third directional coupler 20 serves as a combined attenuator and difference network.

The input, coupled to port 2 of coupler 22, is divided into two components. One component, derived from port 3 of coupler 22, is coupled to the main amplifier 10 by way of ports 1 and 3 or coupler 21. The other signal component, derived from port 4 of coupler 22 is coupled to port 2 of coupler 20, and serves as the reference signal. Port 1 of coupler 22 and port 4 of coupler 21 are resistively terminated.

The amplified signal derived from the main amplifier is coupled to port 1 of coupler 20. In its combined capacity as attenuator and difference network, coupler 20 couples a fraction of the amplified signal to port 4 along with the reference signal. By appropriate selection of the coupling coefficient between ports 1 and 4, and the relative phases of the signals at ports 1 and 2, a difference signal is formed in port 4 which includes only error components. These are amplified in error amplifier 11, coupled to port 2 of coupler 21, and injected into the input terminal of amplifier 10 in such phase as to minimize the overall error produced in the output signal derived from port 3 of coupler 20. The operation of the error feedback portion of the circuit is based upon well-known, prior art feedback techniques and, in this regard, the same stability criteria apply.

As an example, let us assume that the amplifier shown in FIG. 2 is to provide 20 db. of gain and 40 db. of error degeneration. Using 6 db. couplers for the signal divider and error injection network, and a 21 db. coupler for the attenuator and difference network, the signal levels at various locations within the amplifier can be defined. Designating the input signal as 0 db., the signal at port 3 of coupler 22 is −6 db.

and the reference signal at port 4 of coupler 22 is −1 db. The input signal experiences an additional 1 db. loss in passing through coupler 21 and is therefore −7 db. at the input terminal of the main amplifier. In order to realize an overall gain of 20 db. amplifier 10 must have a gain of 27 db., resulting in a 20 db. signal at port 1 of coupler 20. Being a 21 db. coupler, the signal experiences negligible additional loss in passing through coupler 20 to output port 3. The signal in port 4, however, is attenuated 21 db. and is thus essentially equal to the reference signal derived from port 4 of coupler 22, which is also −1 db. The attenuated output signal and the reference signal combine 180 degrees out of phase in port 4 to produce the error signal which is coupled to error amplifier 13.

To produce the required 40 db. of error degeneration, the error loop, comprising error injection network 12, main amplifier 10, attenuator and difference network 20, and error amplifier 11, must have 40 db. of loop gain, or the error amplifier must have 40 db. of gain. Obviously, the parameters of the circuit can be varied in accordance with the needs of the particular application at hand.

It will be noted from equation (11) that the signal-to-noise ratio of the amplifier is given as the ratio of the reference signal, $k_2e$, to the error amplifier noise $\epsilon_n$. Hence, in the illustrative embodiment, the input signal is divided unequally and the larger component used as the reference signal.

Figure 3:
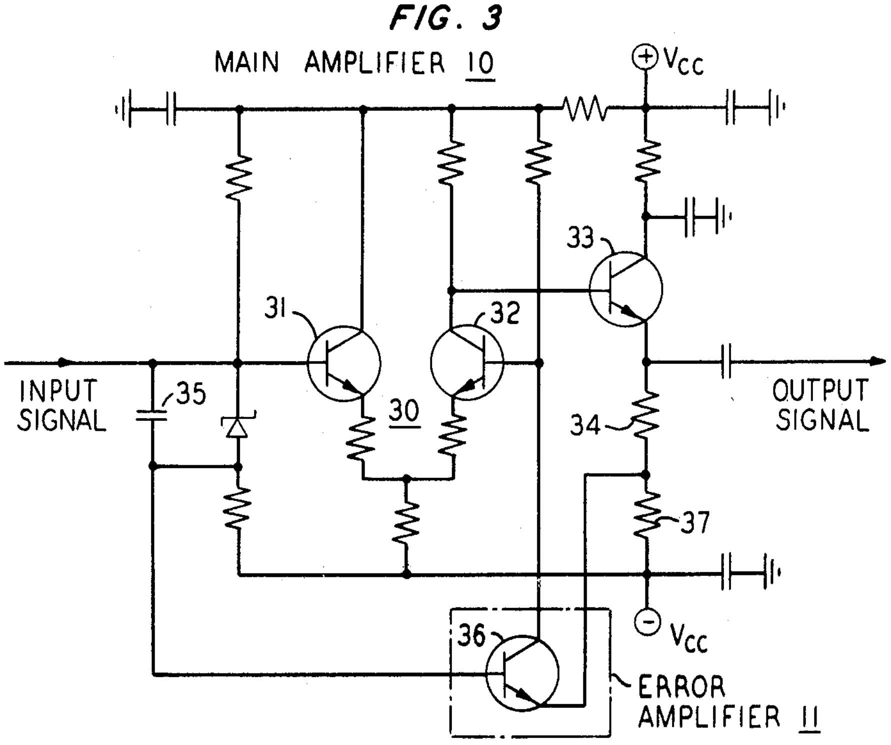
FIGS. 2 and 3 are circuit diagrams of two specific embodiments of the invention.

FIG. 3 shows a second illustrative embodiment of the invention wherein the main amplifier includes a differential amplifier 30, comprising transistors 31 and 32, and an emitter follower stage comprising transistor 33. The error amplifier comprises transistor 36.

An input signal, applied to the base electrode of transistor 31, is amplified by the differential amplifier 30. The amplified signal, derived from the collector electrode of transistor 32, is coupled to the base electrode of transistor 33. The output signal is taken across the series-connected impedances 34 and 37 in the emitter circuit of transistor 33.

The input signal is also coupled to the base electrode of transistor 36 through a capacitor 35. Simultaneously, the portion of the output signal developed across impedance 37 is coupled to the emitter electrode of transistor 36.

The circuit parameters are proportioned such that in the absence of any distortion, the signal coupled to the base and emitter electrodes of transistor 36 are in phase and equal in amplitude. So phased and proportioned, no net signal is developed at the collector electrode of transistor 36 in the absence of an error signal. In the presence of an error signal, however, a differential voltage is produced between the base and emitter electrodes of transistor 36. The error voltage thus produced is amplified by the error amplifier and then coupled from the collector electrode of transistor 36 to the base electrode of transistor 32.

It will be noted that in the embodiment of FIG. 2, the amplified error signal is coupled to the same terminal as the input signal by means of a separate error injection network 12. In the embodiment of FIG. 3, on the other hand, the use of a differential amplifier, as the input stage of the main amplifier, provides two separate terminals to which the input signal and the error signal can be coupled, respectively. This arrangement makes it unnecessary to include a separate error injection network in this second embodiment. It will also be noted that in FIG. 2 the attenuating and differencing functions are combined in coupler 20. By contrast, in the embodiment of FIG. 3, the attenuating function is performed by resistors 34 and 37 and the differencing function is performed by the error amplifier directly. Thus, the various circuit functions identified by the block diagram of FIG. 1 are separately identified solely for purposes of explanation. As has been shown, however, they can be combined in a variety of ways.

It will be noted that in the block diagram of FIG. 1 and in the two illustrative embodiments, no compensation is provided for the noise and/or distortion introduced by the error amplifier. Generally, no compensation is necessary as the error amplifier need only be a relatively small, low-power amplifier. As such, it can readily be designed to have a low noise figure and low distortion. However, further error reduction can be achieved, when required, by means of multiple loop feedback circuits of the type shown in FIGS. 4 and 5.

Figure 4:
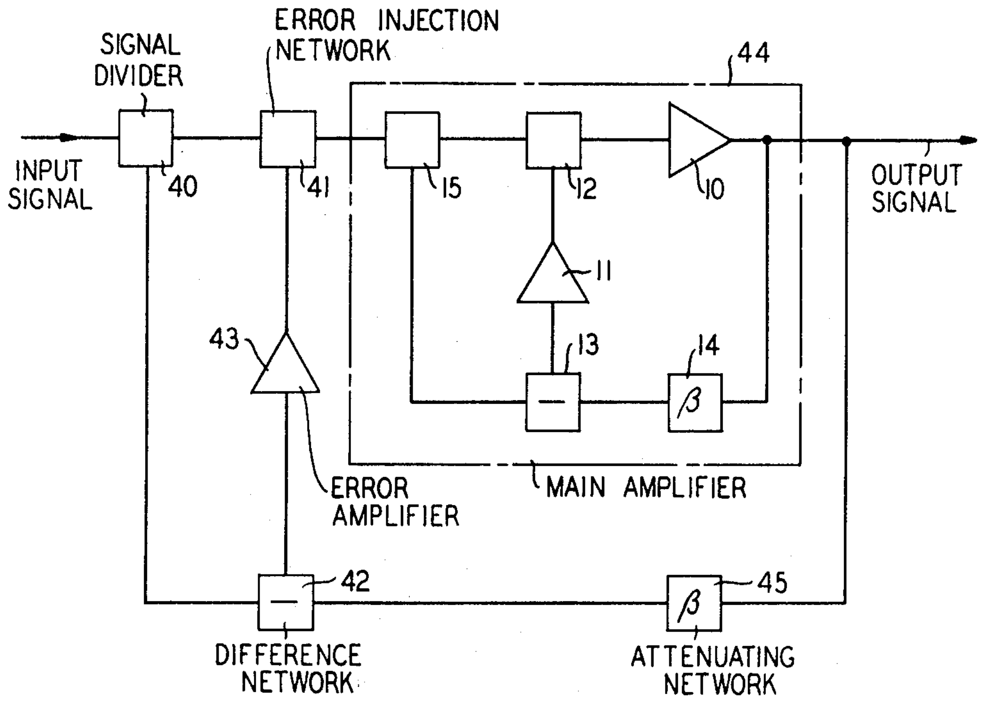
FIGS. 4 and 5 show multiple-loop feedback amplifier circuits in accordance with the invention.

In the multiple-loop feedback circuit of FIG. 4, the entire feedback amplifier of FIG. 1 is considered to be the "main" amplifier to which feedback is to be applied. Thus, as in the basic circuit of FIG. 1, the input signal is divided into two components by means of a signal divider 40. One signal component is coupled to main amplifier 44 by means of an error injection network 41. The other input signal component is coupled to a difference network 42 along with a fraction of the output signal as determined by attenuating network 45. The difference signal produced by network 42 is amplified by error amplifier 43 and the amplified error signal coupled to main amplifier 44 by means of injection network 41.

As indicated above, the main amplifier itself is a feedback amplifier in accordance with the present invention. To emphasize this fact, the same identification numerals are used to identify the circuit components of amplifier 44 as were used in the block diagram of FIG. 1.

Figure 5:
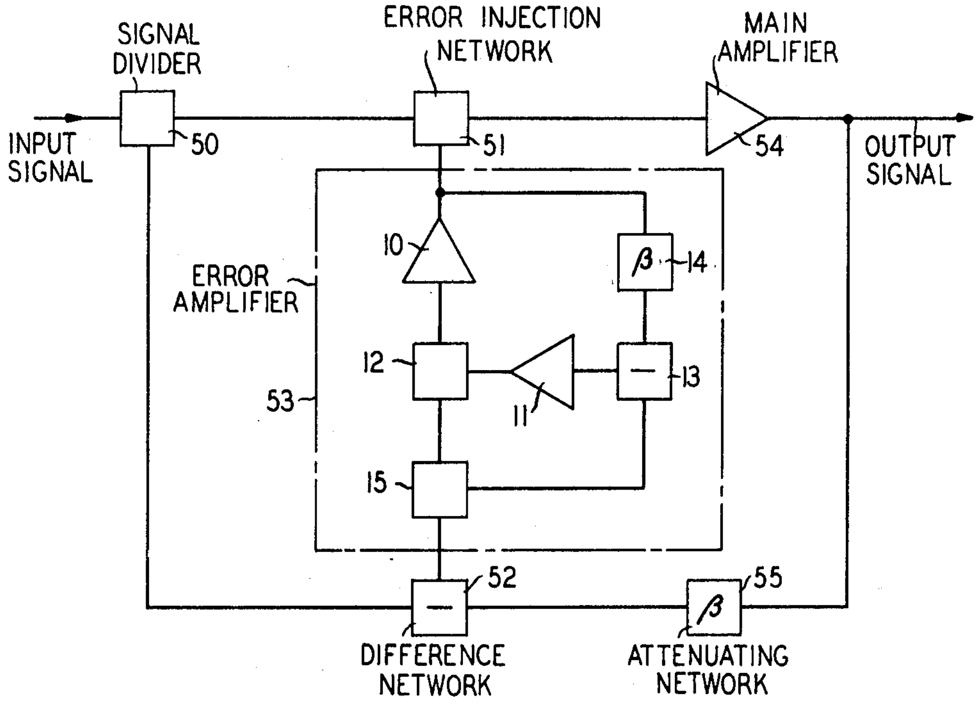

In the multiple-loop embodiment of FIG. 5 the entire amplifier in FIG. 1 serves as the error amplifier. Thus, in FIG. 5 the input signal is divided into two components by a signal divider 50. One signal component is coupled to main amplifier 54 by means of an error injection network 51. The other input signal component is coupled to a difference network 52 along with a fraction of the output signal as determined by attenuating network 55. The difference signal produced by network 52 is amplified by error amplifier 53 and the amplified error signal coupled to the main amplifier 54 by means of injection network 51.

As indicated above, the error amplifier 53 is itself a feedback amplifier in accordance with the present invention. To emphasize this fact, the same identification numerals are used to identify the circuit components of amplifier 53 as were used in the block diagram of FIG. 1.

It is apparent that the multiple-loop circuits of FIGS. 4 and 5 can be combined. For example, error amplifier 43 in FIG. 4 can be replaced by the feedback-corrected error amplifier 53 of FIG. 5. In addition, more feedback loops can be added to obtain any desired level of error degeneration. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A feedback amplifier comprising:

a main signal amplifier;

first, second, and third directional couplers;

and an error amplifier;

means, comprising said first directional coupler, for dividing an input signal into two unequal components;

means, comprising said second directional coupler, for coupling the smaller of said components and the output from said error amplifier into the input port of said main signal amplifier;

means, comprising said third directional coupler, for comparing the larger of said components and the output of said main signal amplifier to form an error signal and an output signal;

and means for coupling said error signal to the input of said error amplifier.

2. A feedback amplifier according to claim 1 wherein the main amplifier is itself a feedback amplifier in accordance with claim 1.

3. A feedback amplifier according to claim 1 wherein the error amplifier is itself a feedback amplifier in accordance with claim 1.

* * * * *